US012696043B2

(12) United States Patent
Nagai et al.

(10) Patent No.: US 12,696,043 B2
(45) Date of Patent: Jul. 28, 2026

(54) IMAGING APPARATUS

(71) Applicant: CANON KABUSHIKI KAISHA, Tokyo (JP)

(72) Inventors: Keita Nagai, Tokyo (JP); Osamu Harada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/888,401

(22) Filed: Sep. 18, 2024

(65) Prior Publication Data

US 2025/0106580 A1 Mar. 27, 2025

(30) Foreign Application Priority Data

Sep. 27, 2023 (JP) ................................. 2023-165283

(51) Int. Cl.

| | |
|---|---|
| *H04N 13/00* | (2018.01) |
| *G10L 25/51* | (2013.01) |
| *H04N 13/189* | (2018.01) |
| *H04N 13/207* | (2018.01) |
| *H04R 1/02* | (2006.01) |
| *H04R 3/00* | (2006.01) |
| *H04R 5/00* | (2006.01) |
| *H04R 5/027* | (2006.01) |
| *H04S 3/00* | (2006.01) |
| *H04S 7/00* | (2006.01) |

(52) U.S. Cl.
CPC ................ *H04S 7/30* (2013.01); *G10L 25/51* (2013.01); *H04N 13/189* (2018.05); *H04N 13/207* (2018.05); *H04R 1/028* (2013.01); *H04R 3/005* (2013.01); *H04R 5/027*

(2013.01); *H04S 3/008* (2013.01); *H04R 2499/11* (2013.01); *H04S 2400/01* (2013.01); *H04S 2400/15* (2013.01); *H04S 2420/11* (2013.01)

(58) Field of Classification Search
None
See application file for complete search history.

(56) References Cited

U.S. PATENT DOCUMENTS

| | | | | |
|---|---|---|---|---|
| 2016/0302005 A1* | 10/2016 | Fedosov | ................ | G06F 17/15 |
| 2018/0270416 A1* | 9/2018 | Kaga | ........................ | H04R 1/02 |
| 2019/0116314 A1* | 4/2019 | Tran | ................. | H04M 1/72412 |

(Continued)

FOREIGN PATENT DOCUMENTS

JP 2020057987 A 4/2020

*Primary Examiner* — Zhihan Zhou

(74) *Attorney, Agent, or Firm* — Canon U.S.A., Inc., IP Division

(57) ABSTRACT

An imaging apparatus includes an imaging circuit and at least one CPU or at least one circuit configured to realize the functions of the following units: a conversion unit configured to convert a sound signal acquired by a microphone including a plurality of microphone elements disposed at respective predetermined angles into stereophonic sound data; an extraction unit configured to extract a sound signal of a specific sound source from the sound signal acquired by the microphone and convert the sound signal of the specific sound source into omnidirectional data of the stereophonic sound data; a combination processing unit configured to combine the stereophonic sound data and the omnidirectional data; and a recording unit configured to record sound data output from the combination processing unit and image data acquired by the imaging circuit.

5 Claims, 13 Drawing Sheets

(56)         References Cited

U.S. PATENT DOCUMENTS

| 2019/0244326 A1* | 8/2019 | Shimizu | H04R 1/326 |
| 2020/0015007 A1* | 1/2020 | Matsuura | H04R 3/005 |
| 2020/0112790 A1* | 4/2020 | Kudoh | G06F 3/012 |

* cited by examiner

FIG. 4

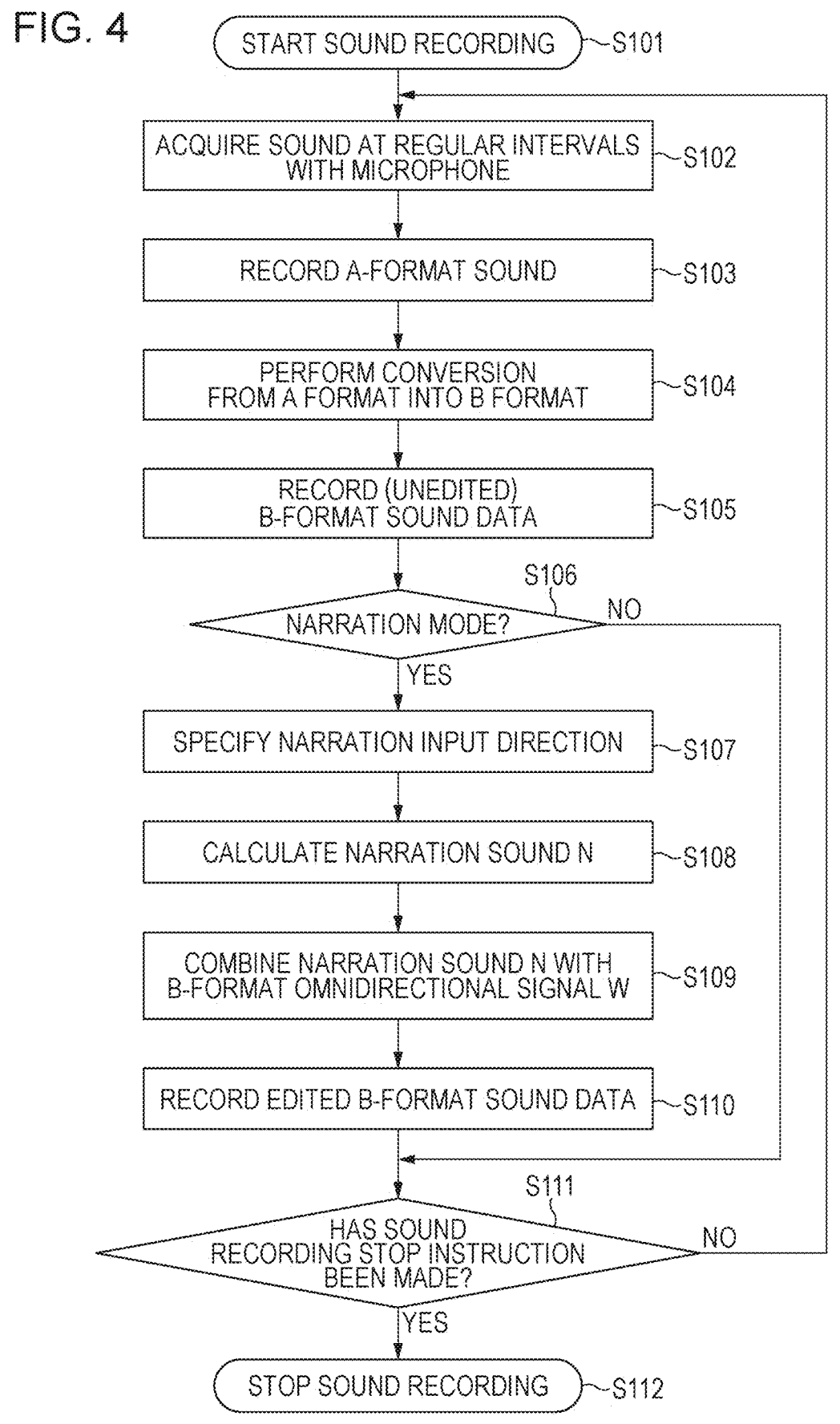

START SOUND RECORDING ~S101

ACQUIRE SOUND AT REGULAR INTERVALS WITH MICROPHONE ~S102

RECORD A-FORMAT SOUND ~S103

PERFORM CONVERSION FROM A FORMAT INTO B FORMAT ~S104

RECORD (UNEDITED) B-FORMAT SOUND DATA ~S105

S106 — NARRATION MODE? — NO

YES

SPECIFY NARRATION INPUT DIRECTION ~S107

CALCULATE NARRATION SOUND N ~S108

COMBINE NARRATION SOUND N WITH B-FORMAT OMNIDIRECTIONAL SIGNAL W ~S109

RECORD EDITED B-FORMAT SOUND DATA ~S110

S111 — HAS SOUND RECORDING STOP INSTRUCTION BEEN MADE? — NO

YES

STOP SOUND RECORDING ~S112

IMAGING APPARATUS

BACKGROUND

Field

The present disclosure relates to an imaging apparatus.

Description of the Related Art

With improvement in a stereoscopic image technique, 3D moving images are becoming popular as common content. For example, video sharing sites support 3D moving images. In this situation, the demand for reproduction of three-dimensional sound fields is increasing to keep up with the stereoscopic image technique.

Ambisonics is known as a technique for reproducing a sound field at a certain position in space. In ambisonics, a sound field at a position where a dedicated microphone array is disposed can be reproduced by reproducing sounds from all directions at the position. A signal having directivity in an optional direction at the position can be generated by processing after sound pickup.

Microphones disclosed in, for example, Japanese Patent Laid-Open No. 2020-57987 have already been provided as microphones for acquiring ambisonic stereophonic sound data. By linking a camera and an ambisonic microphone to perform image capturing, content with both three-dimensional images and three-dimensional sound fields can be provided.

In current years, content aimed at realistic experiences in remote locations, such as online travels or sport watching, are beginning to be offered. In the recording of such content, the use of the above technique can be expected.

However, since sounds in all directions are three-dimensionally recorded in the related art, a sound that a photographer intentionally makes, such as a narration, becomes a sound having directivity. This makes content uncomfortable. It is assumed that some viewers want to turn off the narration. It is also assumed that there is a need to eliminate, from content, sounds that have unintentionally entered the content at the time of image capturing.

SUMMARY

The present disclosure provides an imaging apparatus that is configured to record stereophonic sound and is configured to make specific sound data such as a narration or an unintended noise sound omnidirectional or remove the specific sound data.

An imaging apparatus according to an embodiment of the present disclosure includes an imaging circuit and a memory that stores a program which, when executed by a CPU, causes the imaging apparatus to function as: a conversion unit configured to convert a sound signal acquired by a microphone which is connected to the imaging apparatus and includes a plurality of microphone elements disposed at respective predetermined angles into stereophonic sound data; an extraction unit configured to extract a sound signal of a specific sound source from the sound signal acquired by the microphone and convert the sound signal of the specific sound source into omnidirectional data of the stereophonic sound data; a combination processing unit configured to combine the stereophonic sound data acquired by the conversion unit and the omnidirectional data acquired by the extraction unit and output combined sound data; and a recording unit configured to record the sound data output from the combination processing unit and image data acquired by the imaging circuit into a storage.

Further features of the present disclosure will become apparent from the following description of exemplary embodiments with reference to the attached drawings.

BRIEF DESCRIPTION OF THE DRAWINGS

FIG. 4 is a flowchart according to the first embodiment.

FIG. 5 is a block diagram of a sound processing unit according to the first embodiment.

FIG. 11 is a block diagram of a sound processing unit according to the second embodiment.

FIG. 13 is a block diagram of a sound processing unit according to a modification of the second embodiment.

DESCRIPTION OF THE EMBODIMENTS

Embodiments will be described in detail below with reference to the accompanying drawings.

First Embodiment

Figure 1:
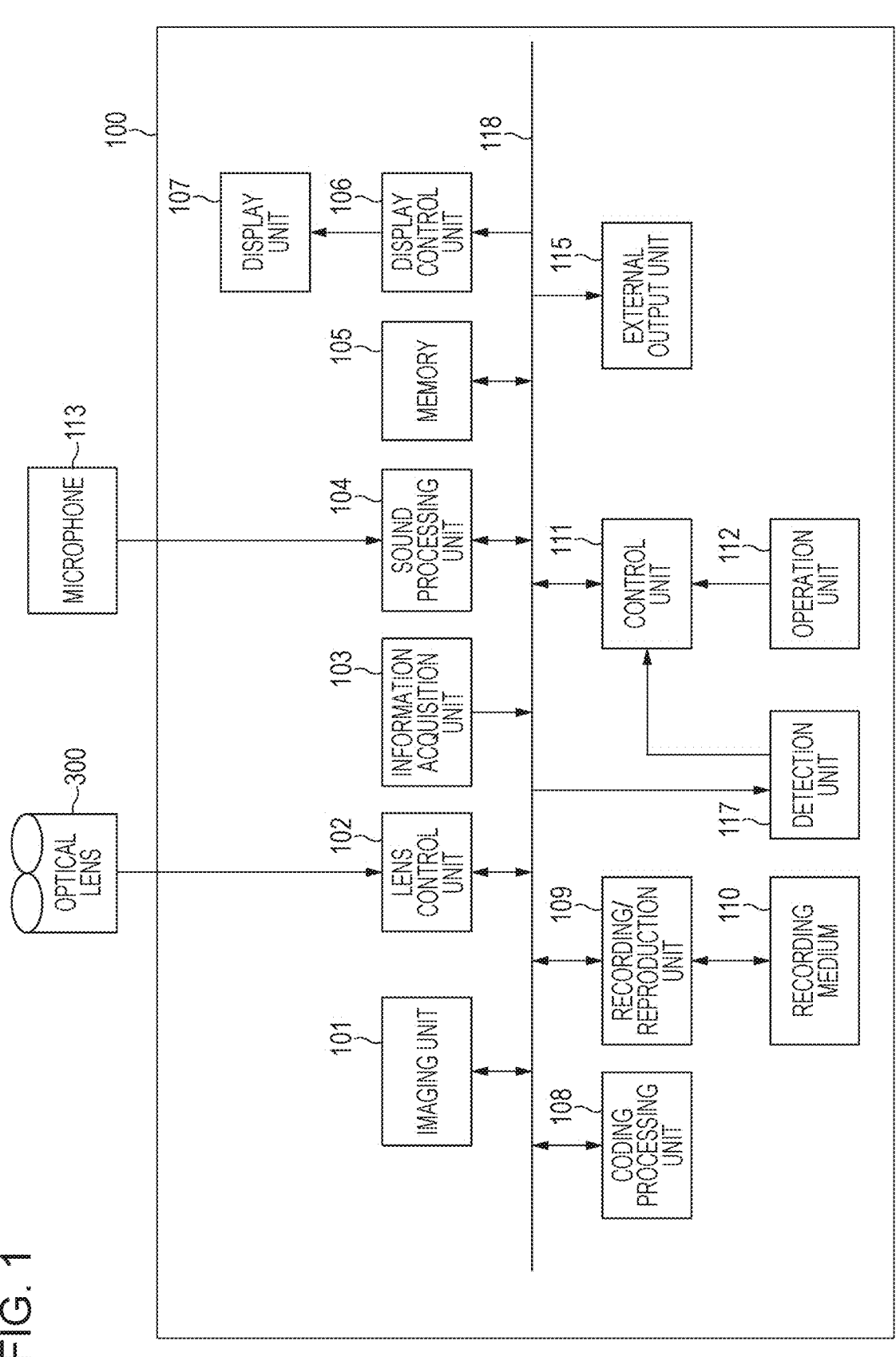
FIG. 1 is a block diagram of an imaging apparatus according to a first embodiment.

FIG. 1 is a block diagram illustrating a configuration of an imaging apparatus 100 according to a first embodiment. An optical lens 300 is a removable optical lens in which an optical lens and a motor for driving the lens are mounted. By controlling the optical lens, respective operations such as focusing, zooming, and camera-shake correction can be performed upon a moving subject during image capturing. The optical lenses 300 of a plurality of types can be attached to the imaging apparatus 100. Note that a user can freely replace the optical lens 300 attached to the imaging apparatus 100 according to the application.

Since an image acquired by the imaging apparatus 100 is a stereoscopic image, the optical lens 300 has a binocular configuration with two optical axes. A binocular disparity that is the difference in image location on the retinas of the right and left eyes is used for a stereoscopic image. A visual system can realize stereopsis by recognizing the depth of an image by this difference in image location. The range of the angle of view of the optical lens 300 can cover up to all directions, but is set to 180 degrees in embodiments.

An imaging unit 101 converts the optical image of a subject captured by the optical lens 300 into an image signal with an imaging device, and performs, for example, analog-to-digital conversion and image adjustment processing upon the image signal to generate image data. The imaging device in the imaging unit 101 may be a photoelectric conversion element represented by, for example, a CCD or CMOS sensor. A lens control unit 102 controls the optical lens 300 as needed based on information acquired from the imaging unit 101 and information of a control unit 111 to be described below.

A sound processing unit 104 is connected to a microphone 113 via a sound input terminal of the imaging apparatus 100. The microphone 113 is an external microphone of the imaging apparatus 100 and is connected to the imaging apparatus 100 by connection terminals including the sound input terminal. The microphone 113 is an ambisonic microphone (hereinafter referred to as a microphone) including at least four unidirectional microphone elements. The microphone 113 collects sounds from all directions of the imaging apparatus 100 with these microphone elements. A sound signal acquired by the microphone 113 is transmitted to the sound processing unit 104. The sound processing unit 104 performs, for example, amplification, analog-to-digital conversion, conversion to the B format in the ambisonic format, and sound signal processing upon the sound signal from the microphone 113 to generate a plurality of pieces of sound data. In the present embodiment, the microphone 113 is externally connected to the sound input terminal of the imaging apparatus 100, but may be built into the imaging apparatus 100. The sound processing unit 104 will be described in detail below.

A memory 105 temporarily stores image data acquired by the imaging unit 101 and sound data acquired by the sound processing unit 104. A display control unit 106 displays, for example, an image corresponding to the image data acquired by the imaging unit 101 and the operation screen and menu screen of the imaging apparatus 100 on a display unit 107 or an external display via the image terminal of an external output unit 115 to be described below.

A coding processing unit 108 reads out the image data and the sound data temporarily stored in the memory 105 and performs predetermined coding upon the image data and the sound data to generate compressed image data and compressed sound data. The sound data does not necessarily have to be compressed. The compressed image data may be obtained with any compression method such as MPEG2 or H.264/MPEG4-AVC. The compressed sound data may also be obtained with any compression method such as AC3AAC, ATRAC, or ADPCM.

A recording/reproduction unit 109 records the compressed image data generated by the coding processing unit 108, the compressed sound data generated by the coding processing unit 108 or sound data, and various pieces of data in a recording medium 110. The recording medium 110 may be a recording medium of any type such as a magnetic disk, an optical disc, or a semiconductor memory on condition that the recording medium can record, for example, the image data and the sound data.

The control unit 111 can control each block in the imaging apparatus 100 by transmitting a control signal to the block. The control unit 111 includes, for example, at least one CPU or at least one circuit, and a memory to perform various controls upon these blocks. The memory used in the control unit 111 includes, for example, a read-only memory (ROM)

for storing various control programs and a random access memory (RAM) for computing processing and also includes an external memory of the control unit 111.

An operation unit 112 includes, for example, various buttons, various dials, and a touch panel. In response to the operation of the operation unit 112 by a user, an instruction signal corresponding to the operation is transmitted to the control unit 111. The operation unit 112 includes, for example, an image capturing button for instructing the start or end of recording of a moving image and a manual volume for adjusting a volume at the time of reproduction of a sound. A data bus 118 transmits various pieces of data such as sound data and image data and various control signals to the respective blocks in the imaging apparatus 100.

The normal operation of the imaging apparatus 100 according to the present embodiment will be described. The imaging apparatus 100 according to the present embodiment supplies power to each block therein from a power supply unit (not illustrated) in response to an instruction for turning on a power supply made by a user via the operation unit 112. Upon receiving power, the control unit 111 checks which mode (e.g., an image capturing mode or a reproduction mode) a mode switching switch in the operation unit 112 indicates based on an instruction signal from the operation unit 112.

In a moving image recording mode, image data acquired by the imaging unit 101 and sound data acquired by the sound processing unit 104 are saved as a single file. In the moving image recording mode, first, the control unit 111 transmits a control signal for transition to an image capturing standby state to the respective blocks in the imaging apparatus 100 to cause the blocks to perform the following operations.

The imaging unit 101 converts the optical image of a subject captured by the optical lens 300 into an image signal with an imaging device, and performs, for example, analog-to-digital conversion and image adjustment processing upon the image signal to generate image data. The imaging unit 101 transmits the acquired image data to the display control unit 106 to display the image data on the display unit 107. A user prepares for image capturing while looking at a screen displayed as above. Subsequently, when an instruction signal for starting image capturing is transmitted to the control unit 111 in response to the operation of a recording button of the operation unit 112 by the user, the control unit 111 transmits the instruction signal for starting image capturing to the respective blocks in the imaging apparatus 100 to cause the blocks to perform the following operations.

The imaging unit 101 converts the optical image of a subject captured by the optical lens 300 into an image signal with an imaging device, and performs, for example, analog-to-digital conversion and image adjustment processing upon the image signal to generate image data. The imaging unit 101 transmits the acquired image data to the display control unit 106 to display the image data on the display unit 107. The imaging unit 101 also transmits the acquired image data to the memory 105.

The sound processing unit 104 converts a sound signal acquired by the microphone 113 into a digital signal to generate sound data. When the multiple microphones 113 are provided, the sound processing unit 104 processes acquired multiple digital sound signals to generate multi-channel sound data. The sound processing unit 104 transmits the acquired sound data to the memory 105.

The coding processing unit 108 reads out the image data and the sound data temporarily stored in the memory 105 and performs predetermined coding upon the image data and the sound data to generate compressed image data and compressed sound data. The control unit 111 combines the compressed image data and the compressed sound data to form a data stream and outputs the data stream to the recording/reproduction unit 109. When the sound data is not compressed, the control unit 111 combines the sound data and the compressed image data stored in the memory 105 to form a data stream and outputs the data stream to the recording/reproduction unit 109. The recording/reproduction unit 109 writes the data stream into the recording medium 110 as a single moving image file under the management of a file system such as the universal disk format (UDF) or the file allocation table (FAT). The above operations continue during image capturing.

When an instruction signal for ending image capturing is transmitted to the control unit 111 in response to the operation of the recording button of the operation unit 112 by the user, the control unit 111 transmits the instruction signal for ending image capturing to the respective blocks in the imaging apparatus 100 to cause the blocks to perform the following operations. The imaging unit 101 stops the generation of image data, and the sound processing unit 104 stops the generation of sound data.

The coding processing unit 108 reads out remaining image data and remaining sound data stored in the memory 105 and performs predetermined coding upon the image data and the sound data to generate compressed image data and compressed sound data. After that, the coding processing unit 108 stops the operation. When sound data is not compressed, the operation is stopped after the completion of generation of the compressed image data. The control unit 111 combines the final compressed image data with the final compressed sound data or the final sound data to form a data stream and outputs the data stream to the recording/reproduction unit 109. The recording/reproduction unit 109 writes the data stream into the recording medium 110 as a single moving image file under the management of a file system such as UDF or FAT. When the supply of the data stream stops, the moving image file is completed and the recording operation is stopped.

When the recording operation stops, the control unit 111 transmits a control signal for transition to the image capturing standby state to the respective blocks in the imaging apparatus 100 and returns to the image capturing standby state. The image file recorded in the imaging apparatus 100 is reproduced as a stereoscopic image by a reproduction apparatus (not illustrated) such as a head-mounted display. The image to be reproduced includes a recorded sound superimposed thereon. For example, a sound is output in accordance with the direction of rotation of the head of a user wearing, for example, a head-mounted display that is a reproduction apparatus, so that a realistic image is provided. The block configuration of the imaging apparatus 100 and the outline of the operation at the time of recording of a moving image have been described above.

Figure 2:
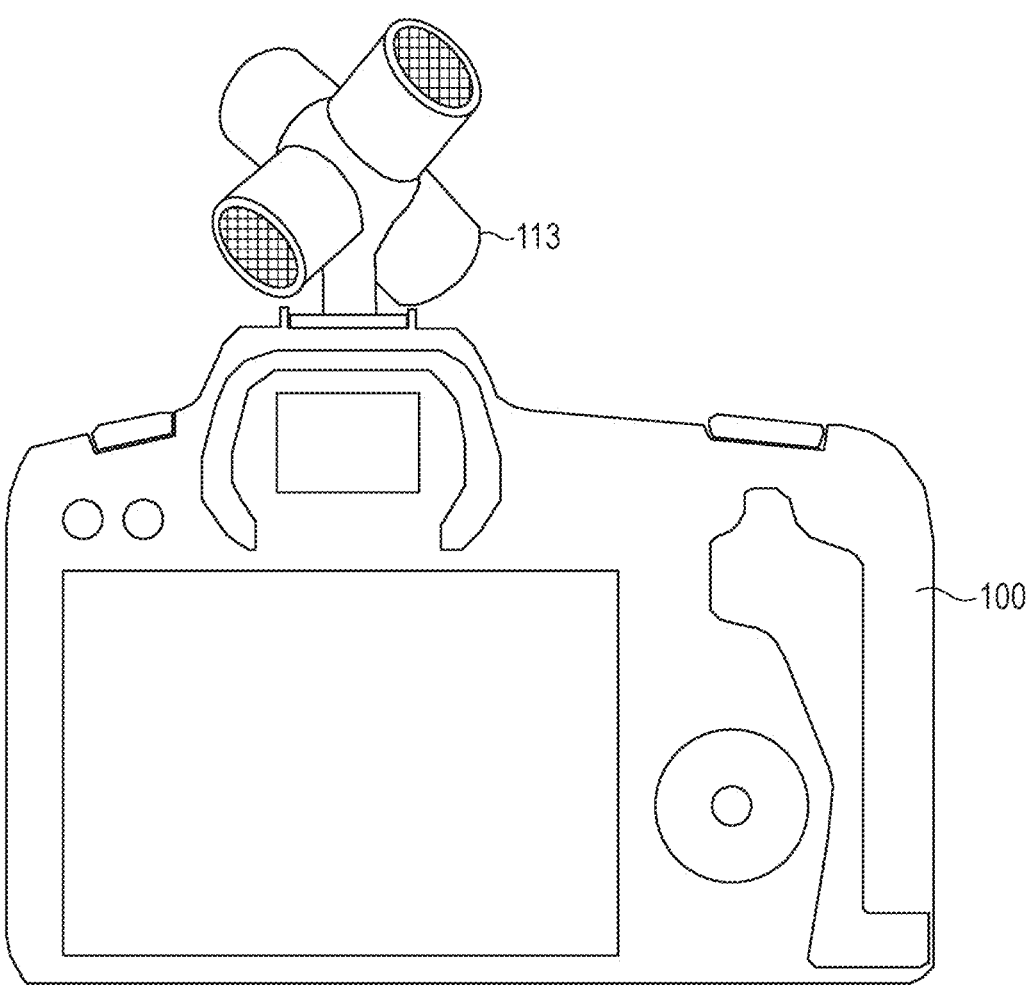
FIG. 2 is a schematic diagram of the imaging apparatus describing the disposition of a microphone according to the first embodiment.

Processing for making a narration sound omnidirectional according to an embodiment will be described below with reference to FIGS. 2 to 8. FIG. 2 is a schematic diagram of the imaging apparatus 100 to which the microphone 113 is attached. By connecting the microphone 113 capable of recording stereophonic sound to the sound input terminal of the imaging apparatus 100, the sound data of stereophonic sound can be recorded while a moving image is captured.

Figure 3A:
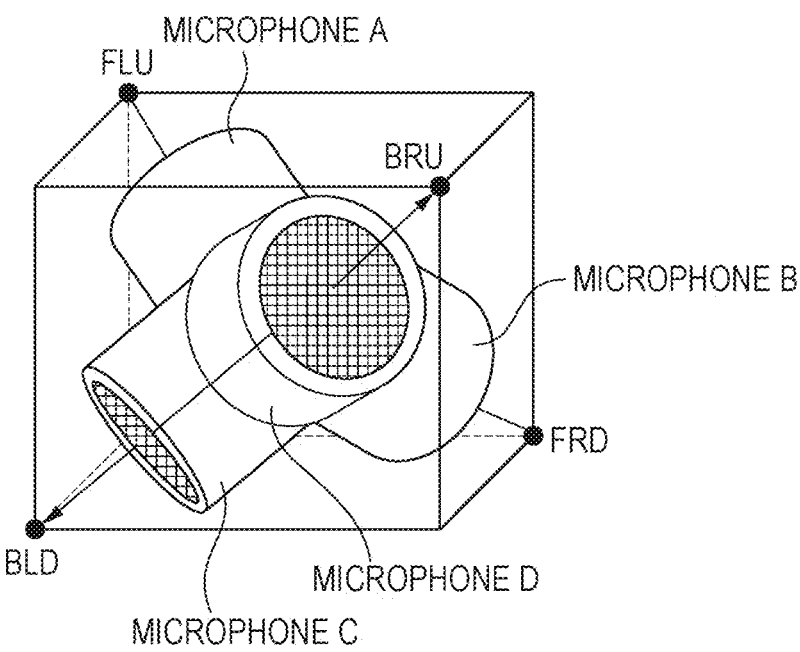
FIGS. 3A and 3B are schematic diagrams of the microphone for acquiring stereophonic sound according to the first embodiment.
Figure 3B:
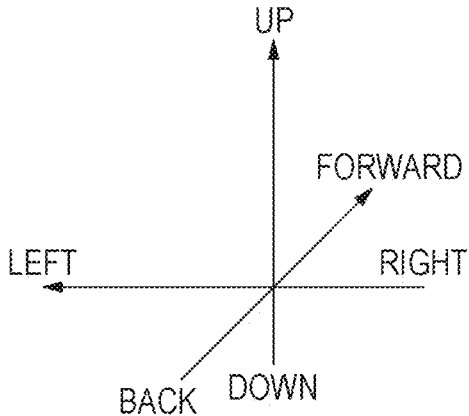

FIGS. 3A and 3B are schematic diagrams of the microphone 113 capable of acquiring stereophonic sound with the ambisonic method. As illustrated in FIG. 3A, the microphone 113 includes four microphone elements A to D.

The four microphone elements A to D are disposed at respective predetermined angles. In an embodiment, the microphone elements A to D are provided facing the four vertices of a cube illustrated in FIG. 3A. When space in the drawing is defined by directions illustrated in FIG. 3B, the microphone element A faces the forward-left-up vertex, the microphone element B faces the forward-right-down vertex, the microphone element C faces the back-left-down vertex, and the microphone element D faces the back-right-up vertex. Since each of the four microphone elements A to D is a unidirectional microphone, the microphone acquires a sound component in the direction that the microphone faces. Four pieces of sound data acquired by the respective microphone elements are called A formats in the ambisonic format.

FIG. 4 is a flowchart according to the first embodiment. In step S101, the recording of a moving image and a sound starts when an instruction for starting image capturing is made by, for example, the operation unit 112. Although only the recording of a sound will be described below, the recording of a moving image may also be performed. The process of the flowchart illustrated in FIG. 4 is performed by the control unit 111 controlling each unit.

When image capturing starts in step S101, the acquisition of a sound by the microphone 113 starts in step S102. At that time, it is desired that a sound be acquired at any regular intervals and sound processing computation to be described below be performed. The acquisition of a sound is continuously performed until an instruction for ending image capturing is made via, for example, the operation unit 112.

Figure 5:
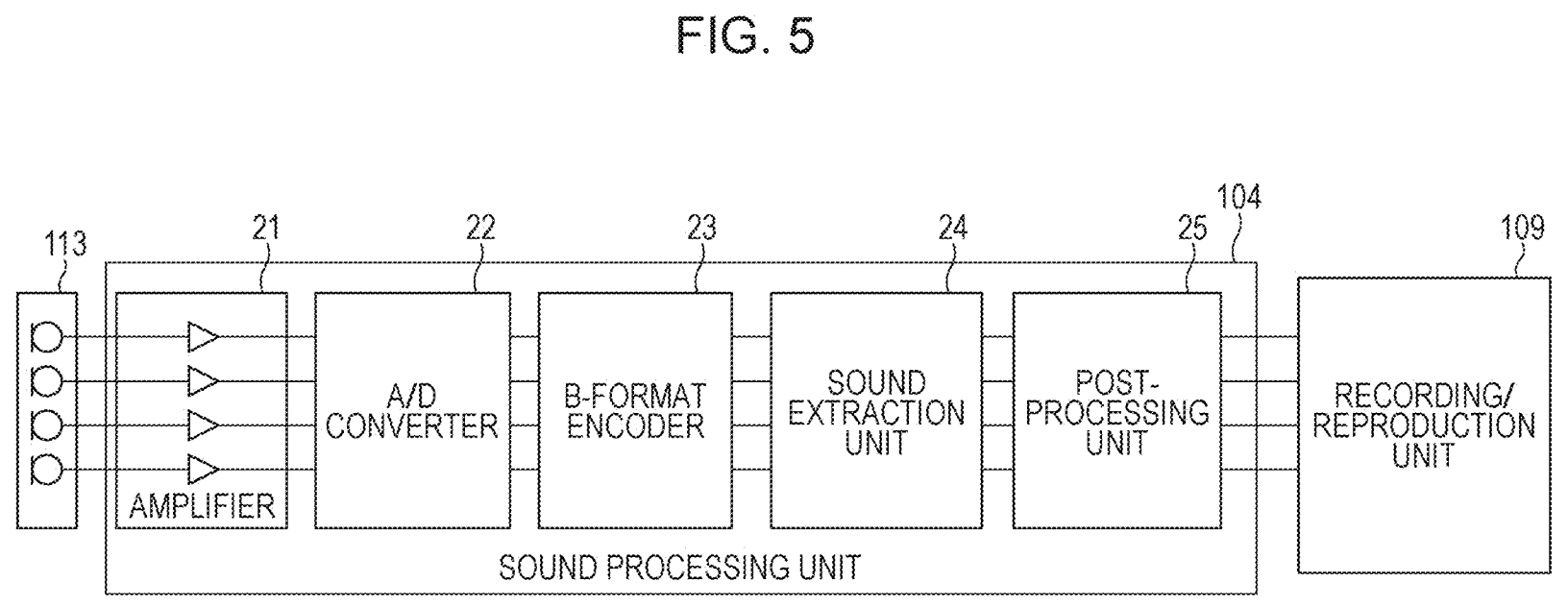

FIG. 5 is a block diagram including the detailed configuration of the sound processing unit 104 for acquiring stereophonic sound data. In the sound processing unit 104, an amplifier 21 performs amplification processing upon a sound signal acquired by each of the microphone elements in the microphone 113 with an analog gain. The sound signal that has been subjected to the amplification processing is converted into a digital signal by analog-to-digital conversion processing in an A/D converter 22.

In step S103, the ambisonic A-format data acquired in step S102 is recorded in the recording medium 110. When the recording of A-format data is not set by a user, this step is unnecessary.

In step S104, the ambisonic A-format data acquired in step S102 is converted into B-format data. In a stereophonic sound technique using ambisonics, the A format cannot be used as it is and needs to be converted into the B format. The B format is sound data including omnidirectional data and bidirectional data in the stereophonic sound technique using ambisonics. The B format is a data format composed of an omnidirectional signal W in all directions, a forward-back directional signal X, a left-right directional signal Y, and an up-down directional signal Z. A B-format encoder 23 performs conversion from the A format to the B format with expressions (1) to (4).

$$W = FLU + FRD + BLD + BRU \tag{1}$$

$$X = FLU + FRD - BLD - BRU \tag{2}$$

$$Y = FLU - FRD + BLD + BRU \tag{3}$$

$$Z = FLU + FRD + BLD + BRU \tag{4}$$

In these expressions,

W: the omnidirectional signal (the B format),

X: the bidirectional signal in the forward-back direction (the B format),

Y: the bidirectional signal in the left-right direction (the B format),

Z: the bidirectional signal in the up-down direction (the B format),

FLU: a forward-left-up signal acquired by the microphone element A (the A format), FRD: a forward-right-down signal acquired by the microphone element B (the A format), BLD: a back-left-down signal acquired by the microphone element C (the A format), and BRU: a back-right-up signal acquired by the microphone element D (the A format).

The respective B-format signals are assigned weights in accordance with a direction that a viewer faces at the time of reproduction and are combined. As a result, a sound based on the orientation of the viewer can be reproduced and stereophonic sound can be realized.

In step S105, the B-format data converted in step S104 is recorded in the recording medium 110. When the recording of unedited B-format data is not set by a user, this step is unnecessary.

In step S106, it is checked whether a mode for making a narration sound omnidirectional (for example, called a narration mode) is set. A user can set the ON or OFF state of the narration mode by operating the operation unit 112. When the narration mode is set, the process proceeds to step S107 to make a narration omnidirectional.

When the narration mode is not set, the processing for making a narration omnidirectional is not performed (is stopped to be performed) and the process proceeds to step S111.

Figure 6:
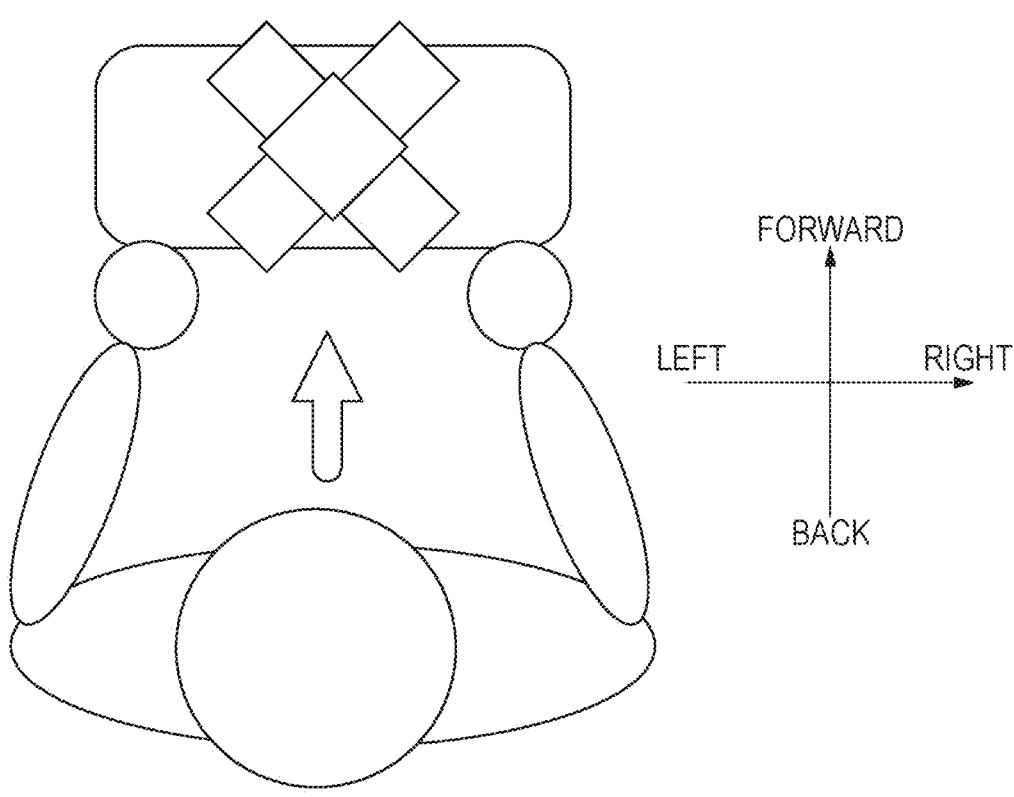
FIG. 6 is a diagram illustrating an exemplary positional relationship between a user and a camera according to the first embodiment.

In step S107, the position of a narration sound source to be made omnidirectional is set. For example, a user sets the position of a narration sound source before starting image capturing by operating the operation unit 112. When a photographer wants to perform image capturing while recording a narration as illustrated in FIG. 6, it is assumed that a narration sound comes from the back. Accordingly, the position of a narration sound source is set to the back of the imaging apparatus 100. The imaging apparatus 100 may include a facial recognition unit, the face of a person who emits voice for a narration may be registered in advance, and a position where facial recognition has been performed may be set as the position of a narration sound source.

Figure 7:
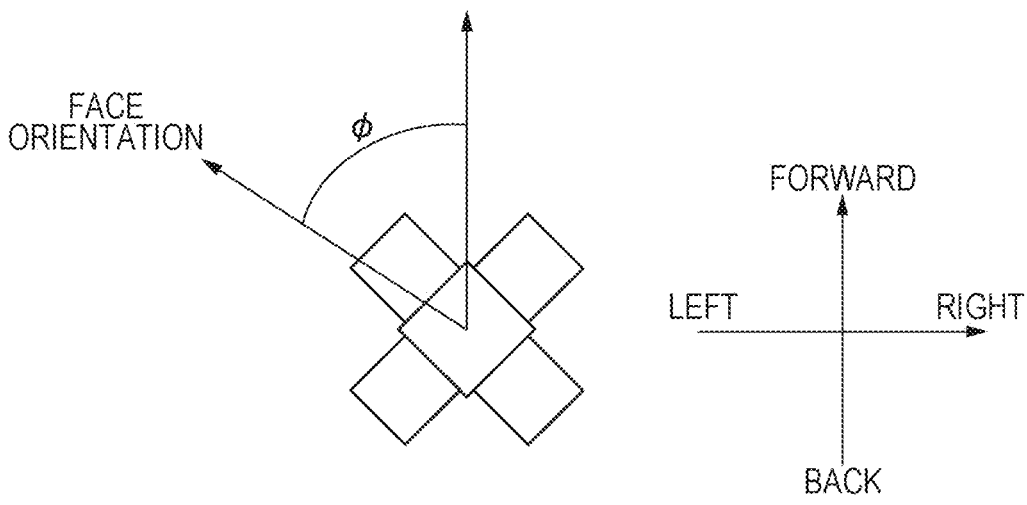
FIG. 7 is a diagram used for description of sound source extraction according to the first embodiment.

In step S108, a narration sound is extracted with the position of a narration sound source set in step S107 and the ambisonic B-format data acquired in step S104. In post-production using the B format in ambisonics, the rotation of the entire sound field can be easily performed. For example, in the case where a sound field heard when a viewer changes the orientation of a viewer's face by @ on a horizontal plane as illustrated in FIG. 7 needs to be reproduced, the reproduction can be achieved with expression (5).

$$\begin{pmatrix} W' \\ X' \\ Y' \\ Z' \end{pmatrix} = \begin{pmatrix} 1 & 0 & 0 & 0 \\ 0 & \cos\Phi & -\sin\Phi & 0 \\ 0 & \sin\Phi & \cos\Phi & 0 \\ 0 & 0 & 0 & 1 \end{pmatrix} \begin{pmatrix} W \\ X \\ Y \\ Z \end{pmatrix} \quad (5)$$

A narration sound N is calculated from expression (6) with the B-format data calculated from expression (5).

$$N = W' + X' \quad (6)$$

A method of acquiring a narration sound is not limited to the above expression. As will be described below, a narration sound may be acquired by another microphone different from the microphone 113. An ambient sound may be removed by, for example, performing filtering specific for human voices upon an extracted sound signal.

In step S109, the narration sound acquired in step S108 is combined with the ambisonic B-format omnidirectional signal W acquired in step S104. For example, calculation is performed with expression (7).

$$Wn = W + N \quad (7)$$

where Wn is an omnidirectional signal including a narration sound.

A method of acquiring an omnidirectional signal including a narration sound is not limited to the above expression.

Figure 8:
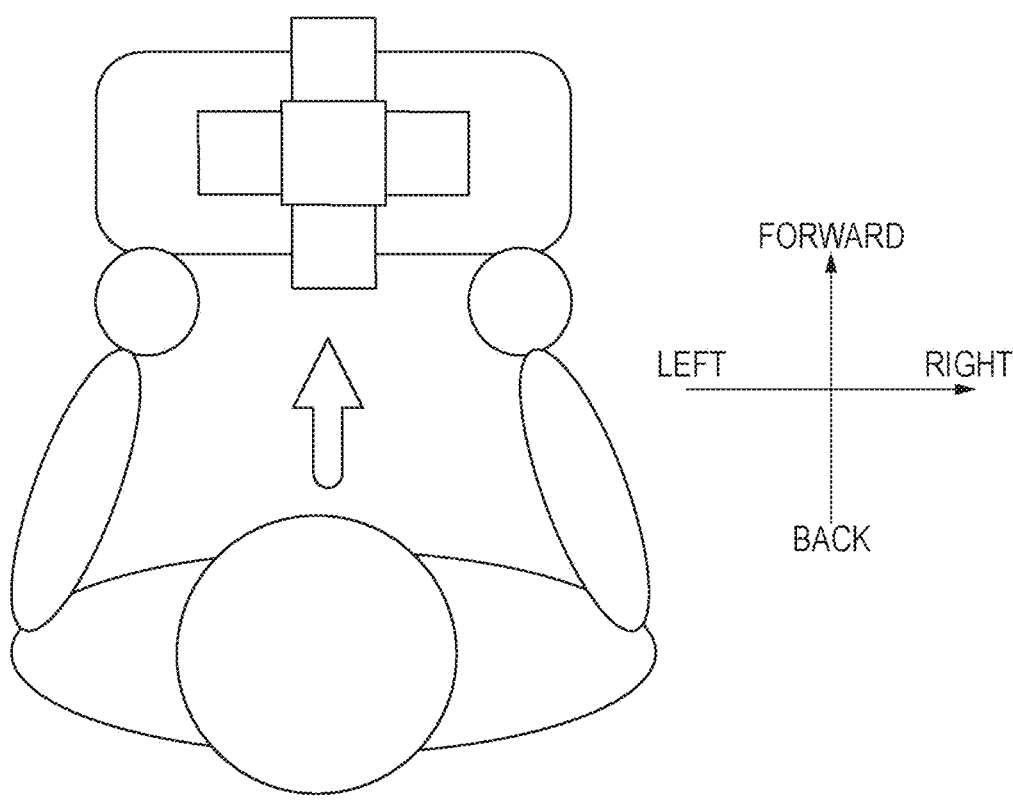
FIG. 8 is a schematic diagram illustrating the disposition of a microphone according to a modification of the first embodiment.

An example of a method of acquiring a narration sound will be described. As illustrated in FIG. 8, one of the four microphone elements included in the microphone 113 is disposed to face a direction that a photographer is facing. The sound of the microphone facing the direction that the photographer is facing can therefore be set as a narration sound. This eliminates the computation in step S108 and can reduce the load on the sound processing unit 104.

In step S110, the ambisonic B-format data acquired by the process to step S109 in which the narration sound has been made omnidirectional is recorded in the recording medium 110. When an image capturing stop instruction is made by, for example, the operation unit 112 in step S111, the process proceeds to step S112 and the recording of a moving image and a sound stops. When the image capturing stop instruction is not made, the process returns to step S102 and sound acquisition continues.

As described above, when a stereoscopic image and stereophonic sound are recorded while a narration sound that is a specific sound source is recorded, the narration sound is recorded as a sound without having directivity and can be provided without causing an uncomfortable feeling by making the characteristics of a microphone at a narration sound source position omnidirectional.

Second Embodiment

In the first embodiment, a narration sound collected by the unidirectional microphone 113 is clearly heard no matter which direction a viewer is facing by making the narration sound omnidirectional.

When the reproduced image of a stereoscopic image including a narration sound is viewed, the narration sound may be annoying to some viewers. At that time, the viewer may turn off the sound output of a reproduction apparatus. However, when the sound output is turned off, an ambient sound of the stereoscopic image is not also heard. Accordingly, this loses realism. In the second embodiment, there is provided an imaging apparatus configured to achieve the reproduction of a realistic image by removing only an annoying narration sound from the sound output of a reproduction apparatus and leaving the ambient sound of a stereoscopic image.

In the present embodiment, a narration microphone for collecting a narration sound is provided in addition to the microphone 113 that is an ambisonic microphone. Sound data collected by the narration microphone includes an ambient sound in addition to a narration sound. Only the narration sound is extracted from the sound data acquired by the narration microphone. By subtracting the extracted sound data from each of pieces of sound data collected by the multiple microphone elements in the microphone 113, sound data that is obtained by removing the narration sound from the sound data collected by the microphone 113 can be acquired.

Figure 9:
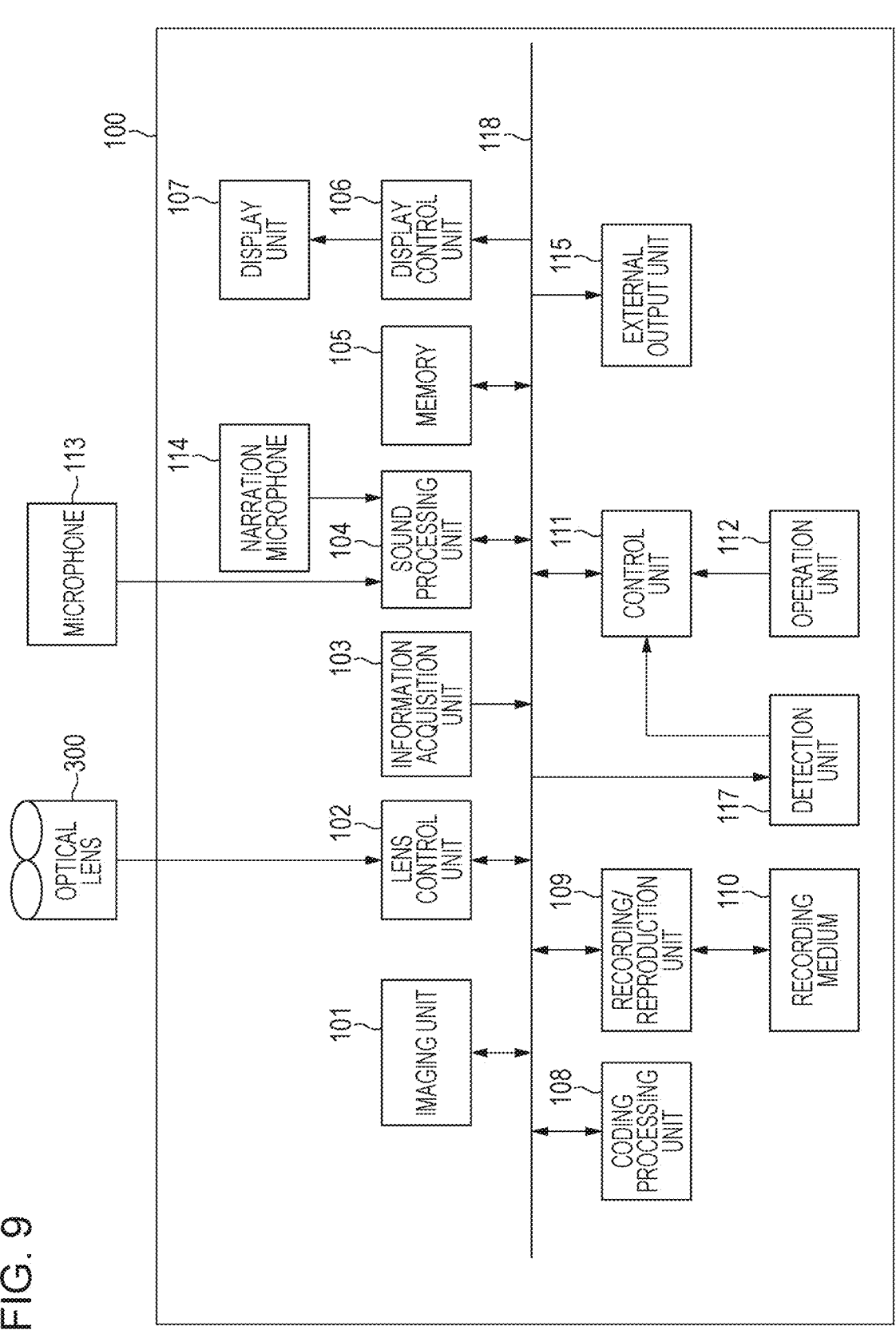
FIG. 9 is a block diagram of an imaging apparatus according to a second embodiment.

FIG. 9 is a block diagram of the imaging apparatus 100 according to the second embodiment. The same reference numeral is added to the same block as that in FIG. 1, and the description thereof will be omitted. The difference from the first embodiment illustrated in the block diagram in FIG. 1 is that a narration microphone 114 for collecting a narration sound is added. The narration microphone 114 is one or more unidirectional microphones incorporated in the imaging apparatus 100, and collected sound data is output to the sound processing unit 104.

In the following description in the second embodiment, the narration microphone 114 is a single unidirectional microphone for simplification. Although the narration microphone 114 is described as a built-in microphone in the imaging apparatus 100 in the second embodiment, the narration microphone 114 may be externally connected to the imaging apparatus 100 like the microphone 113 on condition that it can accurately collect a narration sound. When the narration microphone 114 is externally connected to the imaging apparatus 100, it may be connected to the imaging apparatus 100 in a wired or wireless manner.

Figure 10:
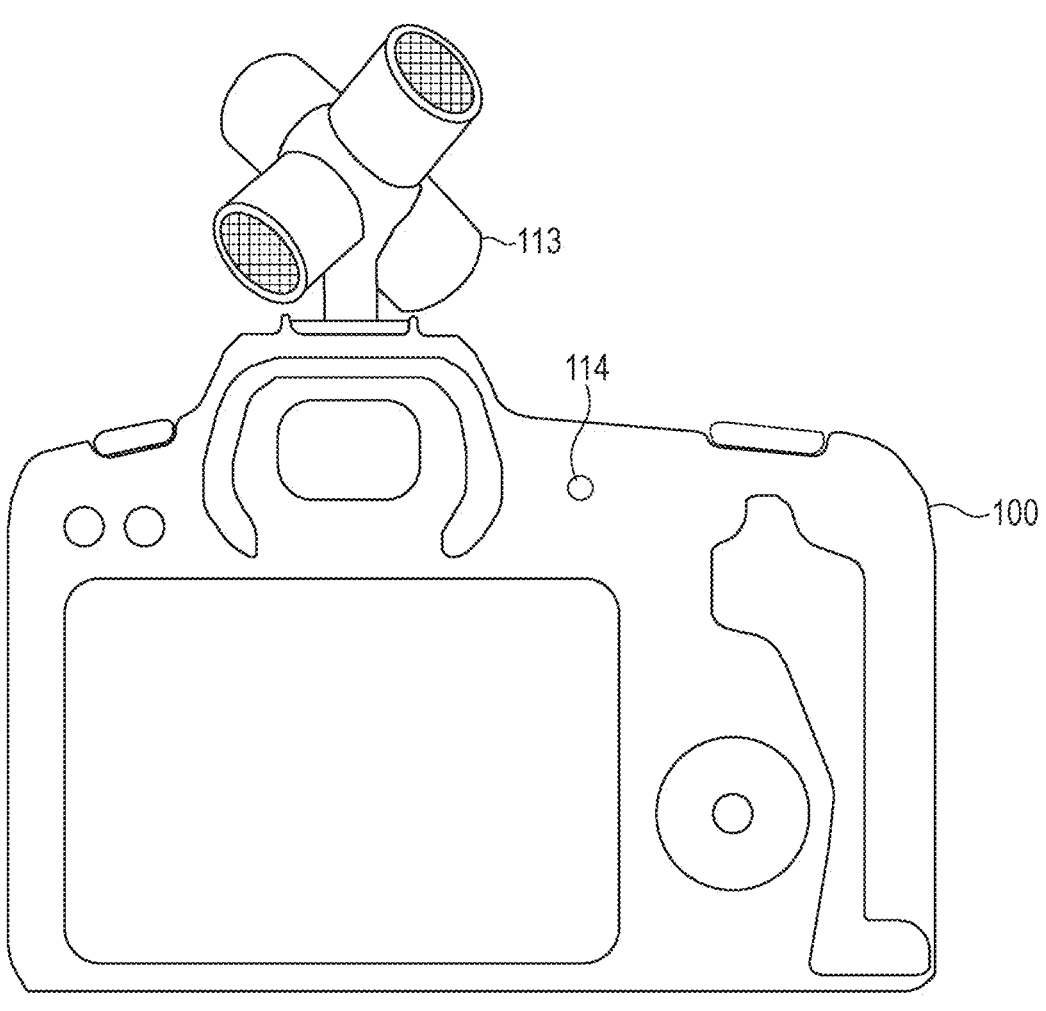
FIG. 10 is a schematic diagram describing the disposition of a microphone according to the second embodiment.

Next, a disposition example of the narration microphone 114 will be described. FIG. 10 is a diagram illustrating the imaging apparatus 100 to which the microphone 113 is attached. The angle of image capturing of the imaging apparatus 100 is 180 degrees. A photographer generally narrates while checking a screen during image capturing. Accordingly, a narration sound source is the back surface of the imaging apparatus 100 that is outside the angle of image capturing of the imaging apparatus 100. It is therefore preferable to dispose the narration microphone 114 on the back surface of the imaging apparatus 100.

Figure 11:
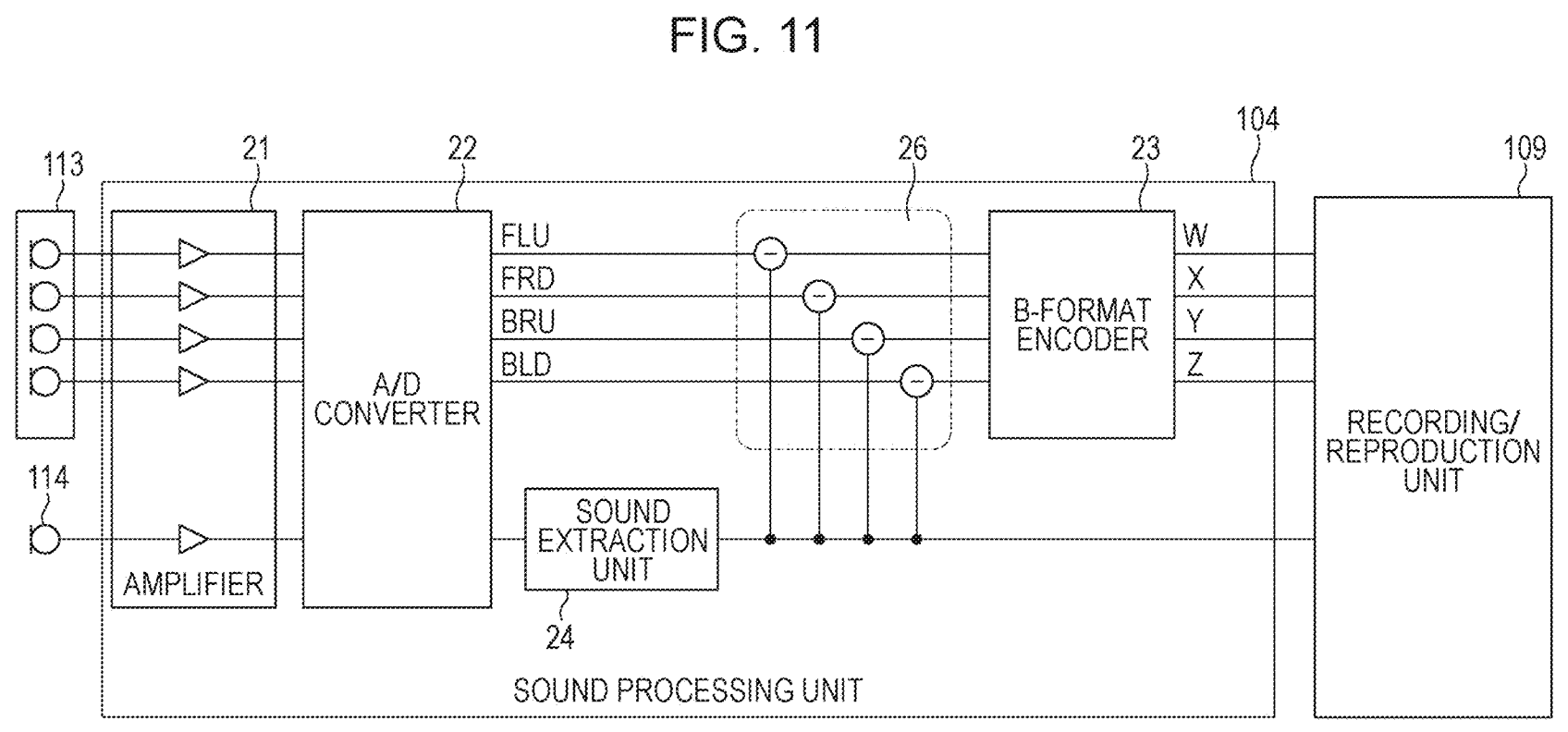

Next, the sound processing unit 104 in the imaging apparatus 100 including the narration microphone 114 will be described with reference to FIG. 11. In the sound processing unit 104 illustrated in FIG. 11, the same reference numeral is added to the same part as that in FIG. 2, and the description thereof will be omitted. Since the narration microphone 114 has been described above, the description thereof will also be omitted.

The sound data collected by the narration microphone 114 is amplified by the amplifier 21 and is converted into a digital signal by the A/D converter 22. The sound data that has been subjected to the analog-to-digital conversion includes not only a narration sound but also an ambient sound. The purpose of collecting a sound with the narration microphone 114 is to remove a narration sound component from respective pieces of sound data collected by the microphone 113. Accordingly, a sound extraction unit 24 extracts only a human voice component, that is, a narration sound, from sound data collected by the narration microphone 114 with a known sound source enhancement technology.

The sound collected by the narration microphone 114 includes a human voice component and the other component that are superimposed on each other. To enhance only the human voice component in the collected sound data, for example, a method is known of estimating a real-numbered time-frequency mask in the discrete Fourier transform region of the collected sound data with a deep neural network.

The sound data extracted by the sound extraction unit 24 is recorded in the recording/reproduction unit 109 as a narration sound and is also output to a removal unit 26. The removal unit 26 performs processing for reducing narration sounds included in the respective pieces of sound data output from the A/D converter 22 by subtracting the narration sound component extracted by the sound extraction unit 24 from the respective pieces of sound data.

In the subtraction processing in the removal unit 26, the narration sound component extracted by the sound extraction unit 24 is subtracted from the respective pieces of sound data output from the A/D converter 22 in a time domain. As another method, for example, each of the pieces of sound data of the microphones 113 and 114 may be converted into a frequency spectrum, subtraction may be performed in a frequency domain, and then the original time-domain sound data may be restored. Any method with which a narration sound component can be removed from the sound data of the microphone 113 may be employed.

In the removal unit 26, a subtracter is connected to each A/D-converted signal output of the microphone 113. The multiple unidirectional microphones included in the microphone 113 have different sound collection directions. The amount of subtraction at the time of the subtraction processing depends on the sound collection direction of the microphone.

For example, when the positional relationship between the microphones 113 and 114 is determined, a weight based on the positional relationship of each microphone set for the microphone in advance is assigned to sound data output form the sound extraction unit 24. The weighted narration sound is subtracted from a corresponding sound signal. Sound collection may be performed before sound recording to measure the relationship between the pieces of sound data of the microphones 113 and 114, and a result of the measurement may be reflected in the subtraction processing.

The sound data from the microphone 113 from which the narration sound component has been removed in the removal unit 26 is converted from the A format into the B format, which are sound data formats, by the B-format encoder 23. The respective pieces of sound data that have been subjected to the conversion into the B format are recorded with the sound data corresponding only to a narration sound from the sound extraction unit 24 in the recording/reproduction unit 109 as pieces of sound information. The sound data corresponding only to a narration sound and the sound data that has been subjected to the removal of the narration sound and the conversion into the B format are recorded in a state in which they are synchronized in time with a recorded stereoscopic image.

Figure 12:
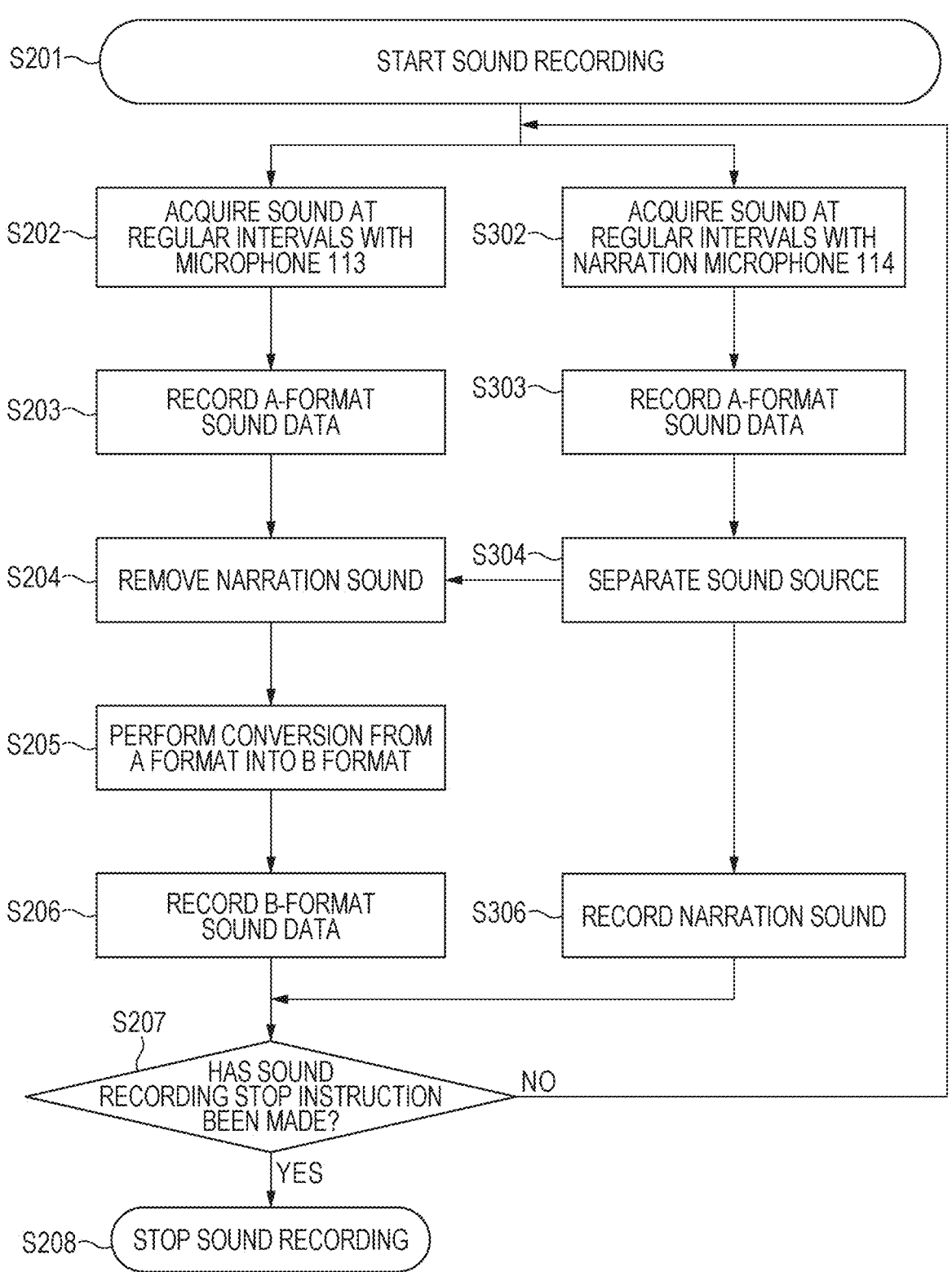
FIG. 12 is a flowchart describing a process according to the second embodiment.

Next, an operation according to the second embodiment will be described with reference to a flowchart illustrated in FIG. 12. In step S201, when an instruction for starting image capturing is made in response to the operation of the operation unit 112 by a photographer, the recording of a moving image and a sound starts. Although only the recording of a sound will be described below, a moving image is actually recorded simultaneously with the sound. The process illustrated in FIG. 12 is performed by the control unit 111 controlling each unit in the imaging apparatus 100.

When a recording operation starts, the microphones 113 and 114 collect sounds at regular intervals (steps S202 and S302). The collected sounds that are the output of the microphone 113 are pieces of A-format sound data. In steps S203 and S303, the pieces of sound data output from the microphones 113 and 114 are temporarily recorded. They may be recorded in the memory 105, or the pieces of A-format sound data that are the output of the microphone 113 may be recorded and stored in the recording medium 110.

In step S304, the sound extraction unit 24 extracts the frequency component of a human voice from the sound data output from the narration microphone 114 and outputs the extracted frequency component as a narration sound. The removal unit 26 subtracts the narration sound extracted by the sound extraction unit 24 from the respective pieces of sound data from the microphone 113. As a result, the narration sound component is removed from the respective pieces of sound data from the microphone 113 (step S204). The multiple pieces of sound data from the microphone 113 from which the narration sound component has been removed are output to the B-format encoder 23. The B-format encoder 23 converts the respective pieces of sound data from the A format into the B format that is a basic data format in ambisonics (step S205). A sound in the B format conforms to the basic data format.

In step S206, the recording/reproduction unit 109 records the multiple pieces of sound data from the microphone 113 that have been converted into the B format in the recording medium 110 in a predetermined sound file format. In step S306, narration sound data from the narration microphone 114 is similarly recorded in the recording medium 110. The respective pieces of recorded sound data are synchronized with each other in terms of time axis. The respective pieces of sound data are separate sound files, are embedded in a moving image file, and are recorded and stored.

In the case where the respective pieces of recorded sound data are reproduced by a reproduction apparatus (not illustrated) along with a stereoscopic image when a viewer performs an operation of turning off a narration sound, only a sound corresponding to the stereoscopic image in the multiple pieces of sound data from the microphone 113 is reproduced. On the other hand, when the narration sound is turned on, the narration sound is superimposed on the above sound corresponding to the stereoscopic image and is reproduced. The narration sound is recorded and stored in the recording medium 110 such that the narration sound is omnidirectional at the time of reproduction.

Referring back to the flowchart in FIG. 12, it is determined in step S207 whether the photographer has made an instruction for stopping sound recording. When the stop instruction has been made (Yes), the sound recording operation stops in step S208. When the stop instruction has not been made (No), the process returns to steps S202 and S303 to continue the sound recording operation.

As described above, in the second embodiment, a sound recorded with a stereoscopic image is separated into a sound for the stereoscopic image and a sound for a narration and these sounds are recorded in respective independent sound files to allow only a narration sound to be turned off at the time of reproduction. As a result, even when a viewer finds a narration sound annoying at the time of reproduction of a stereoscopic image, only the narration sound can be turned off. Since the other sound is reproduced, the realism of the stereoscopic image is not lost and the viewer can enjoy image viewing.

Modification of Second Embodiment

If a viewer wants to know the commentary of a stereoscopic image and various pieces of information with a narration at the time of reproduction of the stereoscopic image, the viewer reproduces the stereoscopic image without muting a narration sound in the second embodiment. However, some viewers want to know the above commentary and the above various pieces of information, but find the quality of a speaker's voice or the speaker's way of speaking uncomfortable. Such viewers need to put up with it without muting the narration sound and cannot therefore enjoy image viewing.

In a modification of the second embodiment, the sound data of a narration sound component extracted by the sound extraction unit 24 is converted into text information. The converted text information is recorded in the recording medium 110 as a text file.

Figure 13:
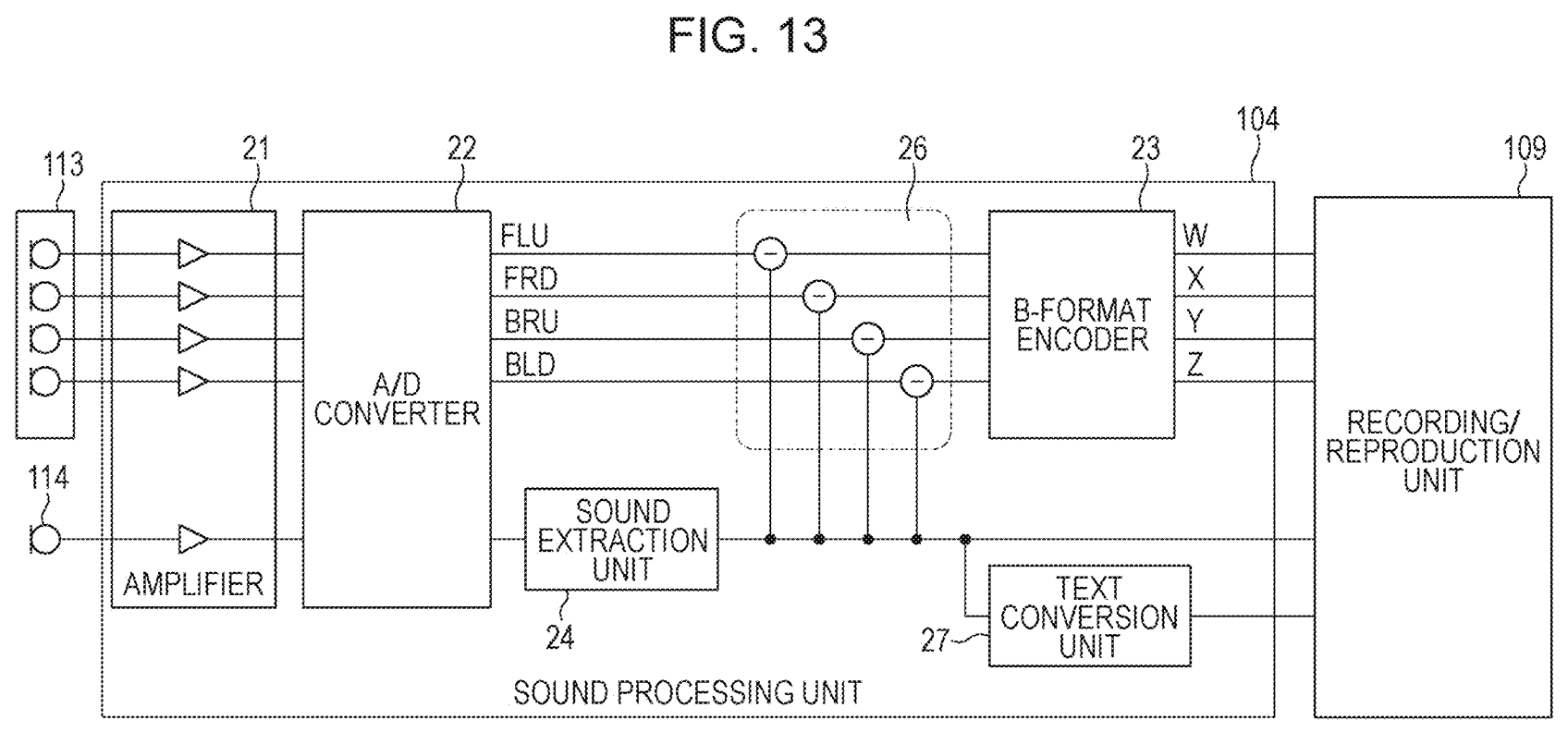

FIG. 13 is a block diagram of the sound processing unit 104 according to the present modification. This block diagram is almost the same as that (FIG. 11) of the sound processing unit 104 according to the second embodiment. The same reference numeral is added to the same block as that in FIG. 11, and the description thereof will be omitted. The difference between FIGS. 13 and 11 is that a text conversion unit 27 is added.

The text conversion unit 27 converts the narration sound component output from the sound extraction unit 24 into text data. The text conversion unit 27 converts the narration sound into the text data with a known speech recognition technique. For example, the text conversion unit 27 extracts a sound feature from the narration sound output from the sound extraction unit 24. A language model for extracting a phoneme from data learned by AI and a pronunciation dictionary are recorded in the imaging apparatus 100 in advance. The extracted sound feature is compared with them to pick up a language combination. The picked-up language combination is output as text data.

The text data output from the text conversion unit 27 is subjected to processing in a predetermined file format in the recording/reproduction unit 109 and is then recorded in the recording medium 110. At the time of reproduction of a stereoscopic image, for example, icons are displayed on reproduction screens illustrated in FIGS. 14A to 14C (lower left portions of screens 141, 142, and 143) to notify a viewer of a current narration state. The cyclical switching between narration states can be performed by the operation of the viewer.

Figures 14A, 14B, 14C:
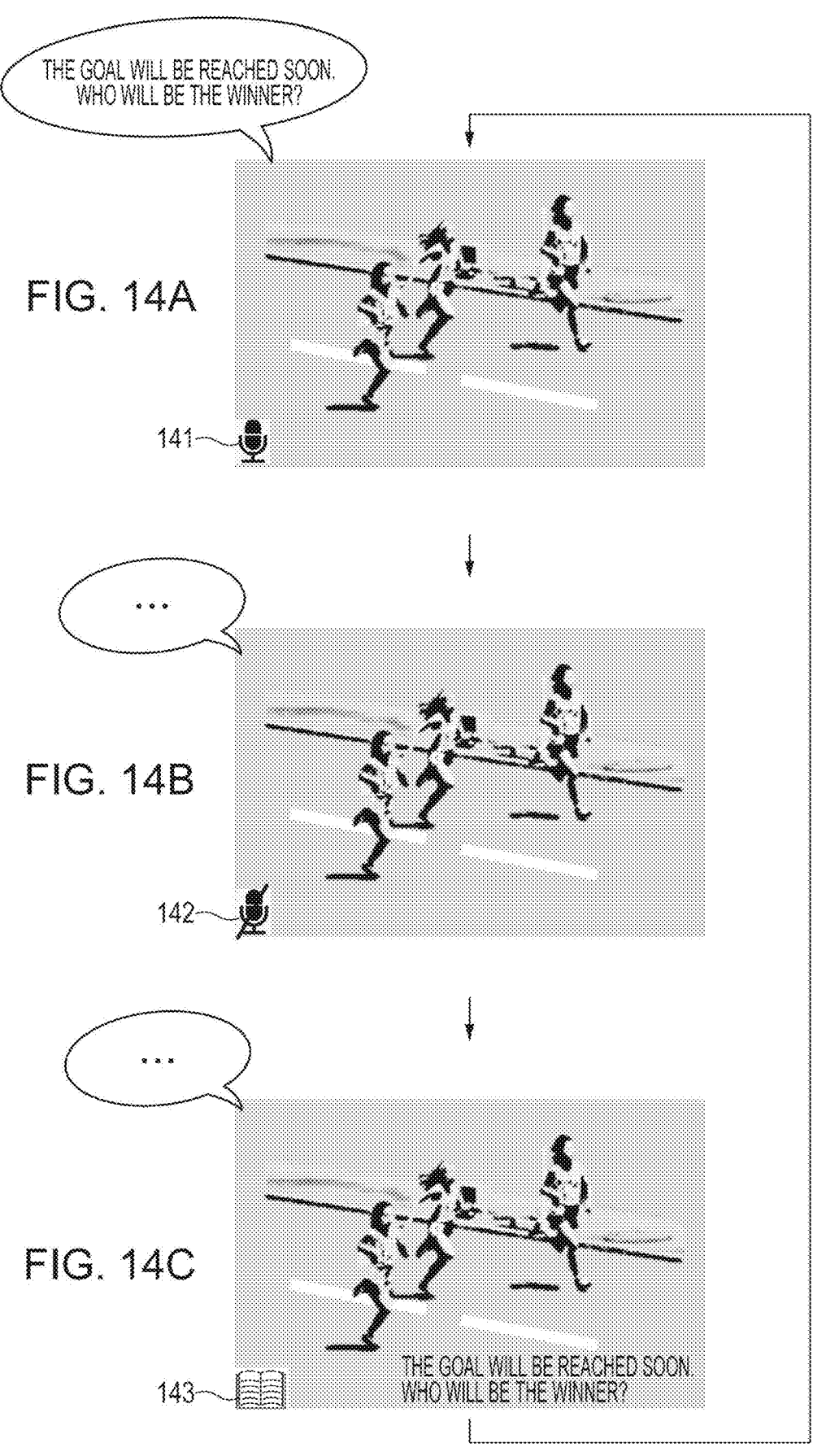
FIG. 14 is a diagram describing a narration output state at the time of reproduction of a stereoscopic image according to the modification of the second embodiment.

A balloon portion illustrated in FIG. 14A represents the state in which a reproduction apparatus (not illustrated) outputs a narration sound from a sound output, and balloon portions illustrated in FIGS. 14B and 14C represent the state in which a narration sound is not output. FIG. 14A illustrates the state in which a narration sound is enabled and an ambient sound at the time of image recording and a narration sound are output from the sound output of the reproduction apparatus. FIG. 14B illustrates the state in which the narration sound is disabled and only the ambient sound at the time of image recording is output from the sound output of the reproduction apparatus.

FIG. 14C illustrates the state in which the narration sound is disabled but only the ambient sound at the time of image recording is output from the sound output of the reproduction apparatus while text into which the narration sound has been converted is superimposed and displayed on the reproduction screen of the reproduction apparatus.

The text conversion unit 27 may add the inflection of an input narration sound to the text data.

At the time of reproduction of a stereoscopic image, using the above added information, a text display expression method may be employed in FIG. 14C of, for example, increasing a font size, making a font bold, or changing a font itself based on the inflection state of the narration sound. The inflection state of a narration sound may be determined based on the amount of change in, for example, the strength and loudness of a sound over time which has been detected at the time of extraction of the sound feature performed by the text conversion unit 27.

The narration microphone 114 according to the present embodiment is a single unidirectional microphone as described above, but may include a plurality of microphones disposed in different orientations. The direction of a narration sound may be estimated with these microphones, and a sound source direction may be added to a text signal. At the time of reproduction of a stereoscopic image, a text display frame may be made into a balloon shape to face the direction of the narration sound source in FIG. 14C using the above added information.

As described above, in the modification of the second embodiment, text data of a narration sound is also stored at the time of sound recording. Accordingly, even when a viewer turns off the output of the narration sound at the time of reproduction of a stereoscopic image, the viewer can know narration details without hearing the narration sound by the operation thereof.

The present disclosure can provide an imaging apparatus that is configured to record stereophonic sound and is capable of making specific sound data such as a narration or an unintended noise sound omnidirectional or removing the specific sound data.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-165283 filed Sep. 27, 2023, which is hereby incorporated by reference herein in its entirety.

What is claimed is:

1. An imaging apparatus comprising:
an imaging circuit; and
a memory that stores a program which, when executed by a CPU, causes the imaging apparatus to function as:
a conversion unit configured to convert a sound signal acquired by a microphone which is connected to the imaging apparatus and includes a plurality of microphone elements disposed at respective predetermined angles into stereophonic sound data;
an extraction unit configured to extract a sound signal of a specific sound source from the sound signal acquired by the microphone and convert the sound signal of the specific sound source into omnidirectional data of the stereophonic sound data;
a combination processing unit configured to combine the stereophonic sound data acquired by the conversion unit and the omnidirectional data acquired by the extraction unit and output combined sound data;
a recording unit configured to record the sound data output from the combination processing unit and image data acquired by the imaging circuit into a storage;
a setting unit configured to set whether to record the sound signal of the specific sound source; and
a control unit configured to, when a setting of not recording the sound signal of the specific sound source is made, performs a control such that combining processing of the omnidirectional data with the stereophonic sound data acquired by the conversion unit is stopped, and
wherein, when the setting of not recording the sound signal of the specific sound source is made, the stereophonic sound data not combined with the omnidirectional data is recorded by the recording unit.

2. The imaging apparatus according to claim 1,
wherein the conversion unit converts the sound signal acquired by the microphone into ambisonic B-format sound data,
wherein the extraction unit outputs ambisonic B-format omnidirectional data, and
wherein the combination processing unit performs combining processing for combining the ambisonic B-format sound data and the ambisonic B-format omnidirectional data.

3. The imaging apparatus according to claim 1, wherein the microphone is an external microphone of the imaging apparatus.

4. The imaging apparatus according to claim 1, wherein the recording unit records the image data acquired by the imaging circuit as a stereoscopic image.

5. A method comprising:
converting a sound signal acquired by a microphone which is connected to an imaging apparatus and includes a plurality of microphone elements disposed at respective predetermined angles into stereophonic sound data;
extracting a sound signal of a specific sound source from the sound signal acquired by the microphone and converting the sound signal of the specific sound source into omnidirectional data of the stereophonic sound data;

combining the stereophonic sound data acquired by the converting and the omnidirectional data acquired by the extracting and outputting combined sound data;

recording the combined sound data output from the combining and image data acquired by an imaging circuit of the imaging apparatus into a storage;

setting whether to record the sound signal of the specific sound source; and wherein when a setting of not recording the sound signal of the specific sound source is made, performs a control such that combining processing of the omnidirectional data with the stereophonic sound data acquired in the converting is stopped, and wherein, when the setting of not recording the sound signal of the specific sound source is made, the stereophonic sound data not combined with the omnidirectional data is recorded.

* * * * *